United States Patent [19]

Calder, Jr. et al.

[11] E Patent Number: Re. 31,953

[45] Reissued Date of Patent: Jul. 23, 1985

[54] METHOD OF CHARGING A BOREHOLE

[75] Inventors: Brooke J. Calder, Jr., Aurora, OH; David L. Childs, Madisonville, Ky.; Roger N. Prescott, Lyndhurst, Ohio; Donald W. Lyons, Madisonville, Ky.

[73] Assignee: Austin Powder Company, Beachwood, Ohio

[21] Appl. No.: 221,920

[22] Filed: Dec. 31, 1980

Related U.S. Patent Documents

Reissue of:

[64] Patent No.: 4,133,247
Issued: Jan. 9, 1979
Appl. No.: 866,277
Filed: Jan. 3, 1978

U.S. Applications:

[62] Division of Ser. No. 740,799, Nov. 11, 1976.

[51] Int. Cl. ..... F42D 1/08
[52] U.S. Cl. ..... 86/20 C; 102/318
[58] Field of Search ..... 102/313, 314, 315, 317, 102/318, 320, 322, 275.7

[56] References Cited

U.S. PATENT DOCUMENTS

| | | | |
|---|---|---|---|
| 3,256,814 | 6/1966 | Kruppenbach et al. | 102/318 |
| 3,288,065 | 11/1966 | Tousley | 102/318 |
| 3,431,851 | 3/1969 | Kern et al. | 102/318 |
| 3,683,809 | 8/1972 | Burkle | 102/332 |
| 3,709,149 | 1/1973 | Driscoll | 102/312 |
| 3,713,384 | 1/1973 | Turnbull | 102/275.5 |
| 4,060,033 | 11/1977 | Postupack et al. | 102/318 |
| 4,060,034 | 11/1977 | Bowman et al. | 102/318 X |

*Primary Examiner*—David H. Brown
*Attorney, Agent, or Firm*—Body, Vickers & Daniels

[57] ABSTRACT

A method of charging a borehole with at least first and second separate sections of explosive material, which method comprises the steps of providing a detonating cord extending into the borehole, providing a first primer on a first carrier having a time delay connection between the cord and the first primer, this time delay having a first selected value, providing a second primer on a second carrier having a time delay connection between a cord and the second primer, the time delay of the second carrier having a second selected value different from the first selected value, sliding the first carrier and primer along the cord and into detonation association with the first section of explosive material and sliding the second carrier and primer along the same cord to detonation association with the second section of explosive material. Also the carrier for use in a method as described above which carrier includes means for holding the primer, means for slidably securing the carrier with respect to the detonating cord whereby the carrier can move freely and longitudinally along the cord, and means for supporting on the carrier an elongation detonation element extending in a generally linear path from the extending cord to the primer thereon.

5 Claims, 19 Drawing Figures

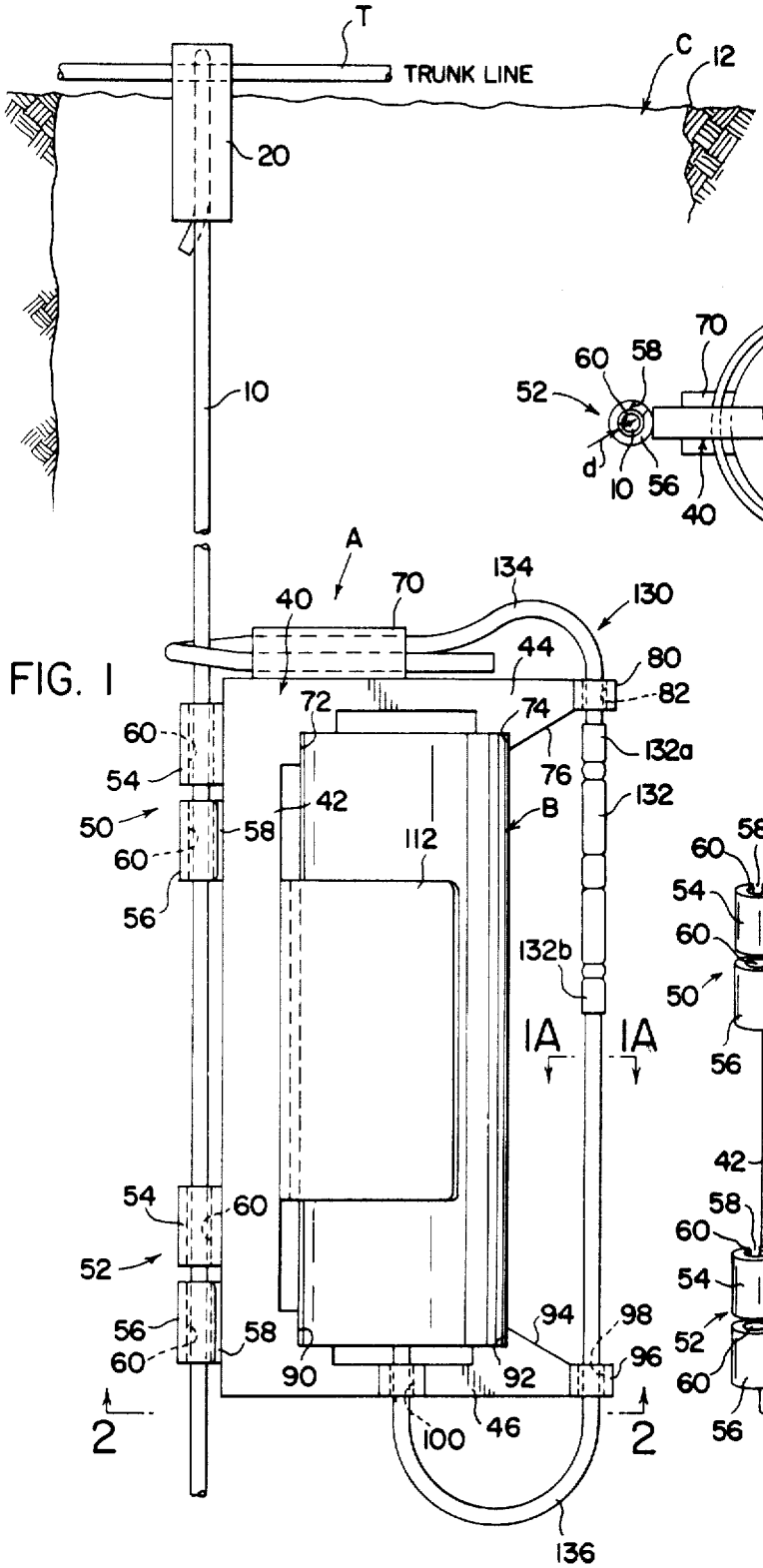
FIG. 1
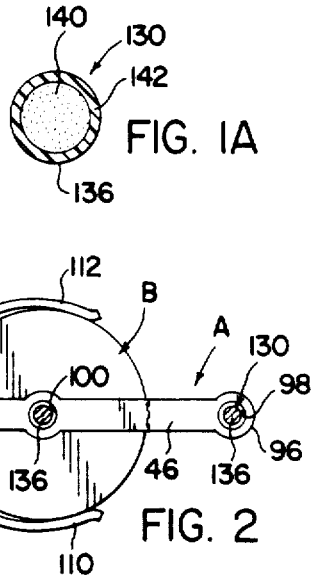
FIG. 1A
FIG. 2
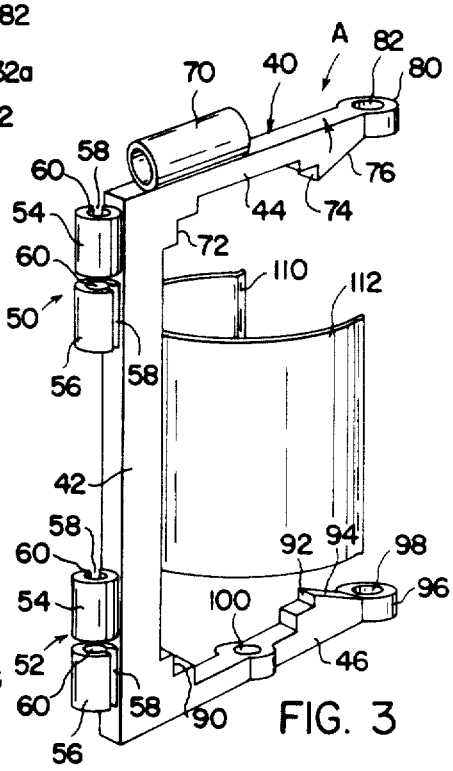
FIG. 3

FIG. 7III $\frac{x}{20} << TD_1 << TD_2 << TD_3$ $T_1 \doteq \frac{x}{20} \doteq$ ZERO $T_2 \doteq \frac{x}{20} + 25ms \doteq 25ms$ $T_3 \doteq \frac{x}{20} + 100ms \doteq 100ms$ $T_4 \doteq \frac{x}{20} + 175ms \doteq 175ms$

METHOD OF CHARGING A BOREHOLE

Matter enclosed in heavy brackets [ ] appears in the original patent but forms no part of this reissue specification; matter printed in italics indicates the additions made by reissue.

This is a division, of application Ser. No. 740,799 filed Nov. 11, 1976.

This invention relates to the art of charging boreholes and more particularly to a carrier for an explosive primer and method of using same.

In using explosives to dislodge or heave material such as in a quarry, is is quite common practice to drill a number of boreholes, charge the boreholes with explosive material such as ANFO or ammonium nitrate slurry, and the detonate the explosive material in the boreholes in sequence to produce the desired movement of material. Since material of the type used in boreholes generally requires an intermediate primer of high explosive material for detonation, various arrangments have been used for priming the boreholes for detonation.

A common arrangement is to secure a detonating cord through the normal opening in a primer and drop the primer and cord to the lower portion of the borehole. Thereafter, explosive material is placed into the borehole or the borehole is filled further with explosive material. In some instances, the borehole is provided with several sections of explosive material separated by non-explosive material, such as soil. In these instances, the primer is required for each of the separate explosive charges. To accomplish this, as each section of charged explosive material is deposited, a primer is dropped down along the detonating cord. After several charges are in place and primed, the same detonating cord can be used to explode all the primers simultaneously. This simultaneously explodes each of the various explosive charges within the borehole to provide maximum heave of the material being moved. These concepts of charging and priming boreholes with standard, available primers are well known and extensively used in the field.

In some instances, maximum earth movement can be accomplished by exploding or detonating various boreholes at different intervals during a single detonation. To accomplish this, the trunk lines used to denonate several detonating cords of different boreholes are interconnected by time delay devices. Thus one group of boreholes controlled by one trunk line can be detonated at a slightly different time than another group of boreholes connected to a separate trunk line. These time delay connections take a variety of forms. Most commonly, they involve a time delay cartridge which is generally cylindrical and has internal structure which delays the propagation of a detonation wave therethrough for a preselected time. The cartridges are often connected at opposite ends to a relatively short section of commercial detonating cord. Thus, to interconnect two trunk lines for different detonating times, one of the time delay detonating cord sections is secured to one trunk line and the other detonating cord section is secured to the other trunk line. During detonation of one trunk line, there is a time delay until detonation of the next trunk line. Also, there are one piece molded time delay couplings which can be connected between somewhat standard detonating cords to provide the same preselected time delay. These cartridges or couplings are well known in the art and can be timed for delays of approximately 5 milliseconds to upwardly of several seconds. Indeed, some time delays are rated at zero time delays and they are often used for a connection between a primer and a low energy type of detonating cord, such as a detonating cord having a grain loading of less than about 10 grains per linear foot. Also, such zero time delay devices can be used with low energy detonating cord of the type having a hollow tube with an inner cylindrical wall coated by explosive material or filled with a combustible gas. In all instances, the time delay devices provide a preselected time shift from the somewhat instantaneous detonation occurring in a detonating cord. The availability and use of these various time delay devices used with detonating cords are well known. In addition, some time delay devices may be used with electrical caps which can be used to explode the high explosive of a primer for detonating the charge in a borehole at a preselected time after an electrical signal.

In recent years, governmental regulations have been adopted which affect the use of explosives of the type described above. One of these regulations, which is becoming quite common, limits the amount of explosive material which can be detonated at any given time within a certain distance from an inhabited building or from a highway or public transportation artery. This regulation has caused certain modifications in the blasting techniques used in congested areas or in areas adjacent specific structures. Compliance with these regulations has resulted in the adoption of the concept of detonating the material in a borehole at different times to prevent a violation or regulations regarding the amount of explosives that can be detonated at any given time. The first attempt to provide a means of detonating several axially spaced explosive charges in a given borehole at different and distinct times has been the use of separate time delay electrical caps for detonating the primer in each of the different axially spaced explosive charges in a single borehole. This procedure involved the conversion of the detonating systems into an electrical system. As is well known, there are certain environments in which an electrical system is not acceptable or completely satisfactory. For instance, when electrical equipment is being used in the vicinity or during electrical storms. When electrical lines are laid for a detonation, these lines can act as an antenna and can be actuated in some unusual situations by electromagnetic waves, such as radio waves. Also, many users are well accustomed to detonating cord and somewhat hesitate to replace such systems with electrical systems to comply with governmental regulations. Thus, there is a substantial amount of effort devoted to the modification of the detonating cord system into a system which will comply with regulations and provide sequential detonation of separate charges axially spaced within a single borehole. One of the most common systems is to provide a separate time delay cartridge in the detonating cord extending to each of several primers within the borehole. This requires the use of separate and distinct down lines extending to the different primers at axially spaced positions within the borehole. This type of arrangement is time consuming and costly. Another arrangement is to provide time delay cartridges at the primers themselves and use several low energy detonation cords extending from the upper trunk line to the separate primers within a given borehole. This concept is not substantially different from the concept of using time delay devices in the down line itself since separate and distinct down lines are required for each primer to produce the time delay required for sequential detonation of the axially spaced charges.

STATEMENT OF INVENTION

In accordance with the present invention, there is provided a method of charging a borehole with at least first and second separated sections of explosive material, the method comprises the steps of providing a detonating cord extending into the borehole; providing a first primer on a first carrier having a time delay connection between the cord and the first primer, the time delay having a first selected value; providing a second primer on a second carrier having a time delay connection between the cord and the second primer, the time delay of the second carrier having a second selected value different from the first selected value; sliding the first carrier and primer along the cord and into detonation association with the first section of an explosive material; and, sliding a second carrier and primer along the same cord and into detonation association with the second section of explosive material.

In accordance with another aspect of the present invention, there is provided a carrier for use in a method and apparatus as defined above, which carrier includes means for holding the primer spaced from the detonating cord a distance preventing the cord from detonating the primer directly; means for slidably securing the carrier with respect to the detonating cord whereby the carrier can move freely and longitudinally along the cord; and, means for supporting on the carrier an elongation detonation element extending in a generally linear path from the extending detonating cord to the primer.

In accordance with yet another aspect of the present invention, the elongated detonation element of the carrier defined above includes a time delay device having a selected time delay value. This time delay value can be between zero and several seconds, such as 12 seconds.

The primary object of the present invention is the provision of a method of detonating, in timed sequence, axially spaced charges of explosive material in a borehole, which method uses a single down line, uses standard detonating cord, uses standard time delay devices and is easy to practice in the field.

Another object of the present invention is the provision of a carrier for the primers used in the method defined above.

Yet another object of the present invention is the provision of a carrier for a primer to be located in one of several axially spaced explosive charges in a borehole, which carrier is easy to produce, can support a time delay device having a variety of time delay values and can slide freely into a desired position on a given down line formed from a detonating cord.

In accordance with still a further object of the present invention, there is provided a carrier as defined above, which carrier can be used with similar carriers to secure a number of primers onto a single detonating cord down line.

These and other objects and advantages will become apparent from the following description taken together with the drawings incorporated herewith.

BRIEF DESCRIPTION OF DRAWINGS

The present invention is illustrated in the accompanying drawings in which:

FIG. 1 is a side elevational view of one embodiment of the present invention;

FIG. 1A is an enlarged cross-sectional view taken generally along line 1A—1A of FIG. 1. FIG. 2 is a bottom view taken generally along line 2—2 of FIG. 1;

FIG. 3 is a pictoral view of the embodiment of the invention shown in FIG. 1;

EMBODIMENTS OF THE INVENTION

Figure 4:
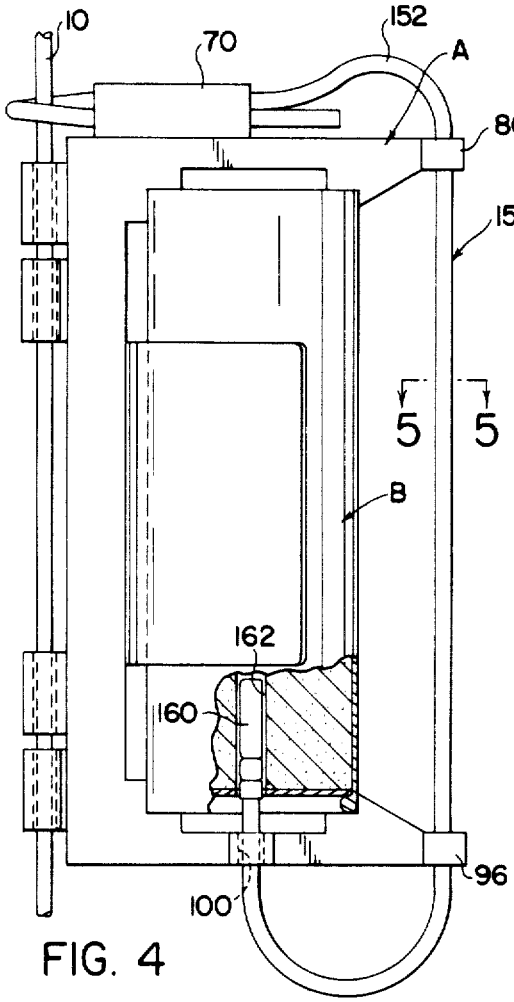
FIG. 4 is a partially cross-sectioned side elevational view showing a slight modification of the embodiment shown in FIG. 1.

Referring now to the drawings, wherein several embodiments of the invention are illustrated together with the preferred embodiment thereof, FIGS. 1–3 show a first embodiment of the present invention wherein a carrier A constructed in accordance with the present invention is used for supporting a standard primer B and for guiding the primer longitudinally along a standard detonating cord 10 extending down a borehole C having an upper open charging end 12. In the preferred embodiment, down line or cord 10 is a standard detonating cord of the type having a loading of about 12–60 grains per foot with a propagation of somewhat over 20,000 feet per second, and preferably 30–60 grains per foot. Such detonating cord is generally not capable of detonating certain explosive material of the type contemplated for charging in borehole C. This material may take a variety of forms, such as ANFO or ammonium nitrate slurry. Thus, in order to detonate the charge in borehole C, in accordance with normal practice, a primer B is needed. This primer is to be detonated by cord 10 for detonation of the charge of explosive material. This concept will be described in more detail with respect to FIGS. 7 and 7A. An upper trunk line T is used for detonating cord 10 in accordance with standard procedure in the field. The trunk line detonating cord has a strength of loading somewhat similar to that of down line 10, although different linear grain loadings could be used. A standard plastic detonating cord coupling 20 is used to loop and hold down line 10 around trunk line T as the down line extends vertically downwardly into borehole C. As will be explained later, several carriers A are used in providing several detonating positions within bore line C. Each of these carriers can slide downwardly along down line detonating cord 10 to different positions within the borehole.

In accordance with the illustrated embodiment of the invention shown in FIGS. 1-3, carrier A is an integral plastic structure having a body portion 40 provided with an upstanding rib 42 and vertically spaced support arms 44, 46. Rib 42 supports axially spaced guide members, such as two pairs 50, 52 of slit rings 54, 46. Each of these rings has a cord inserting, lateral opening 58, opening at opposite sides of each ring for the purpose of preventing carrier A from being dislodged inadvertently from detonating cord 10 as it moves downwardly or longitudinally along the cord. Rings, 54, 56 each have a central opening 60 which allows for the sliding association of carrier A with respect to the downwardly extending detonating cord 10. The spacing d, shown in FIG. 2, allows sliding movement of carrier A. The pair 50 of slit rings 54, 56 is adjacent an upper end of carrier A and generally close to the upper arm 44. By providing rings 54, 56 on the opposite side of rib 42 from a primer B supported with the carrier, the down line 10 can not directly detonate the primer. The spacing between the down line 10 and the primer B is selected so that the detonation of the down line does not cause an inadvertent, direction detonation of primer B.

Referring now to the upper support arm 44, this arm supports a tubular element 70 and includes primer support abutments 72, 74, which are spaced to match the diameter of primer B. In the illustrated embodiment, arm 44 adjacent abutment 74 is somewhat flexible in a vertical direction, as indicated by the arrow in FIG. 3. This allows transverse insertion of primer B over an inclined wall 76. An outboard eyelet 80 provided on arm 44 includes an opening 82 for a purpose to be explained later. Lower support arm 46, which may also be somewhat flexible, supports two abutments 90, 92 spaced along arm 46 in a manner to generally match the diameter of primer B. Again, an inclined wall 44 allows insertion of a primer B into carrier A between the abutments 72, 74 and abutments 90, 92. To prevent transverse dislodging of primer A, there are provided two spaced, somewhat arcuately configured resilient primer support flaps 110, 112.

During use of carrier A, a linear detonating element 130 transmits the detonation wave from detonating cord 10 to primer B along a linear path extending from a position adjacent the upper portion of carrier A to a position at the lower surface of primer B. This detonating element includes, in the illustrated embodiment, a time delay device in the form of a standard time delay cartridge 132 having an input side 132a and an output side 132b. The time delay value for cartridge 132 can be selected to obtain the desired time delay between the detonation of cord 10 and the detonation of primer B. Cartridge 132 is connected to a first length of detonating cord 134 and a second length of detonating cord 136. In this embodiment of the invention, the detonating cord, shown in cross-section in FIG. 1A, is somewhat standard and generally similar to the detonating cord used for cord 10 and trunk line T. In this structure, the detonating cord forming the first and second auxiliary detonating cord lengths 134, 136 include an inner core 140 formed from a high explosive material and an outer support layer 142. This cord is standard detonating cord and is well known in the explosive field.

Delay element 130 is supported on carrier A as shown in FIG. 1. Basically, the first end of auxiliary detonating cord 134 is fed through eyelet opening 82, through tube 70, around down line 10 and back through tube 70. Thus, the opening in tube 70 is sufficient to accept two portions of detonating cord 134. The second auxiliary detonating cord 136 is threaded through a lower eyelet 96 of arm 76 having an opening 98 and through a lower access opening 100 in the same arm. In this manner, the second length of detonating cord is directed into the standard central bore provided during casting or primer B. Detonating cord 136 is generally located about two to four inches into primer B for the purpose of detonating the primer in response to a time delay detonation transmitted through the cartridge 132. By providing a loop of cord 134 at tube 70, th element 130 has a sliding relationship with cord 10 and carrier A can be dropped into borehole C without effecting the ability to transmit detonation from down line 10 to detonating cord 134. Detonation of cord 134 by cord directs the detonation wave to one end of cartridge 132, which then delays the transmission of the detonation wave for a desired, selected length of time. Thereafter, the detonation wave appears at the output side 132b of cartridge 132. This delayed detonation is then transmitted to primer B through detonating cord 136.

In summary, carrier A provides a means to produce a delayed detonation of primer B by spacing the primer from down line 10 and providing a linear element for transmitting the detonation from the down line to primer B in a delayed manner. Also, the loop connection between linear time delay element 130 and down line 10 allows easy sliding of carrier A to the desired actual position within borehole C without destroying the detonation relationship between cord 10 and element 130. The purpose of this function will be explained later in connection with FIGS. 7 and 7A which relate to a method of using carrier A and which method is another aspect of the present invention.

As indicated, linear time delay device 130 extending between cord 10 and primer B is a somewhat standard unit and may have a time delay value between ends 132a, 132b of a selected time value. These values generally range between 5 ms and 12 seconds. Also, the length of cartridge 132 is substantially less than one foot and generally less than about four inches. Consequently, the time delay is not created by extensive length of the elongated time delay cartridge. For the purpose of this invention, the time delay caused by the length of detonating cord 10 or the length of detonating cord sections 134, 136 is disregarded. The detonation in this detonating cord is considered to be instantaneous since propagation of the detonation wave is approximately 0.05 ms or less per linear foot. Thus, time delay, as used in this specification, indicates an element, such as a standard time delay cartridge, which causes a substantial time delay in a relatively short length. For instance, a time delay of at least about 1.0 milliseconds per linear foot. This substantially differentiates a time delay from the speed of the detonation wave of a detonating cord used in illustrating the preferred embodiments of the present invention. There is one exception to the general statement regarding the time delay concept. When using low strength detonating cords, the detonating cord itself does not have the explosive strength required to detonate a primer, under normal circumstances. Thus, it is necessary, when using a low energy cord extending from cord 10 to primer B, to provide a booster or cap between the low energy detonating cord and the primer. This provides a three step detonation involving the cord, the cap and then the primer. Thus, a low energy cord such as one having a loading of high explosives less than about 10 grams per foot, requires the use of a booster to detonate primer B. In this instance, the booster or cap can be provided with a selected time delay as described above. In other words, the booster or cap at primer B can delay detonation of the primer for a selected time generally in the range of at least 5 ms after the booster or cap has been initiated by a low energy detonating cord. In this particular instance, there may be a requirement for somewhat immediate detonation as will be explained in connection with the first stage of the method illustrated in FIG. 7. In that instance, the time delay for the booster or cap when using a low energy detonating cord as the interconnecting linear element may have a time delay value of zero. A time delay value of zero refers to a cap or booster time delay which has a selected value which is substantially instantaneous. This is distinguished from instantaneous detonation by the cord itself. Thus, a time delay can be zero when using a booster or cap in combination with a low energy detonating cord as a substitution for linear element 130 as shown in FIGS. 1, 1A and 2. An embodiment illustrating this concept is shown in FIGS. 4 and 5.

Figure 5:
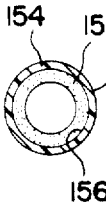
FIG. 5 is an enlarged cross-sectional view taken generally along line 5—5 of FIG. 4.

Referring now to FIGS. 4 and 5, the same carrier A is employed. Linear element 150 is used as a substitution for linear time delay element 130 as shown in FIG. 1. This linear time delay element uses a standard low energy detonating cord 152 shown in cross-section in FIG. 5. This cord can have low grain loading and have the form shown in FIG. 1A. Consequently, a low energy detonating cord with a loading of less than about 10 grams per foot can be employed. As an alternative, and as shown in FIG. 5, the low energy detonating cord can be of the type including a cylindrical tube 154 having an inner cylindrical surface 156 with a thin layer 158 of high explosive material. The cap or booster 160 is provided with a preselected time delay between detonation of primer B and receiving the detonating wave from cord 152. In this manner, as previously described, low energy cord 152 can transmit detonation from cord 10 to primer B. Booster or cap 160 is inserted into the normal central opening 162 of primer B in accordance with normal practice. This cap can have any time delay value; however, in practice it is generally greater than 5 ms and preferably between about 5 ms or 12 seconds. But in this particular embodiment, a time delay caused by booster or cap 160 may have a zero time value to obtain detonation substantially the same time as detonating cord 10. In using carrier A with a low energy detonating cord 152 as the interconnecting, time delay element, booster or cap 160 is inserted into bore 162 of primer B after the primer has been located on carrier A. Thereafter, low energy cord 152 is threaded through eyelets 96 and 80 and then through tube 70. The end of low energy detonating cord 152 is wrapped or looped around down line 10 and then threaded back into and through tube 70. Prior to this operation, carrier A is threaded onto down line 10 for free longitudinal movement along the down line. The operation of the embodiment of the invention shown in FIGS. 4 and 5 is similar to that described in connection with the embodiment of the invention, shown in FIGS. 1–3.

Figure 6A:
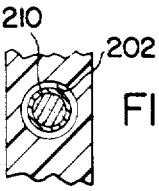
FIG. 6A is a partial, enlarged cross-sectional view taken generally along line 6A—6A of FIG. 6.
Figure 6:
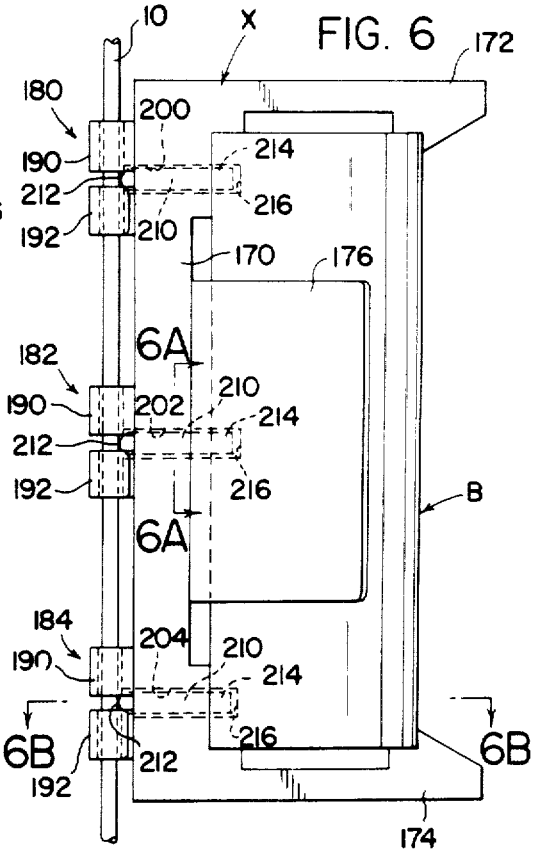
FIG. 6 is a side elevational view showing a further modification of the present invention.
Figure 6B:
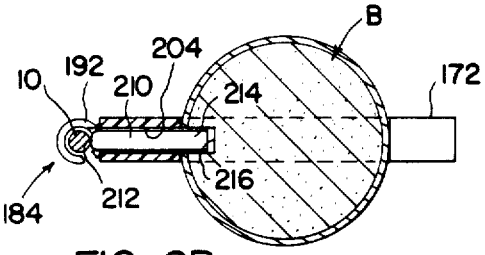
FIG. 6B is a cross-sectional view taken generally along line 6B—6B of FIG. 6.
Figure 7I:
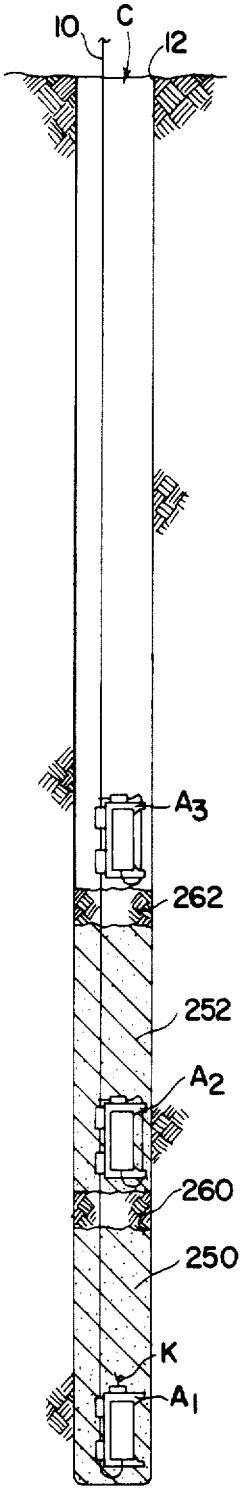
FIG. 7 includes several cross-sectional views I, II, III, IV showing the preferred embodiment of the method used in accordance with the present invention.
FIG. 7A is a graphic illustration of the time delay concept used in the present invention with certain mathematical time delay relationships.
Figure 7I:
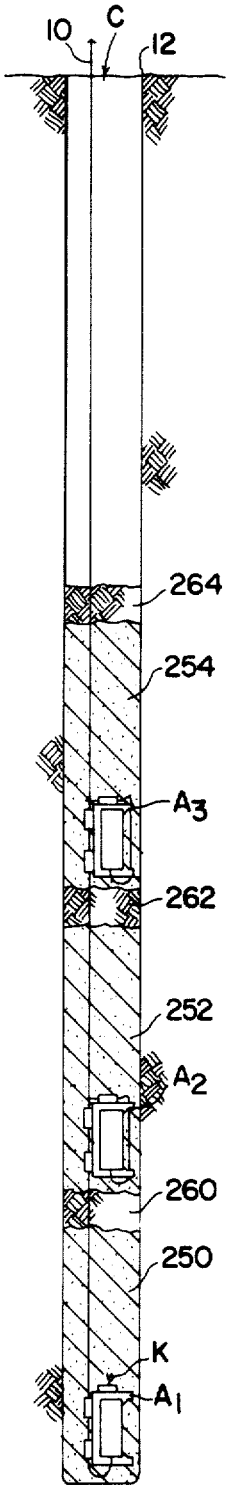
Figure 7I:
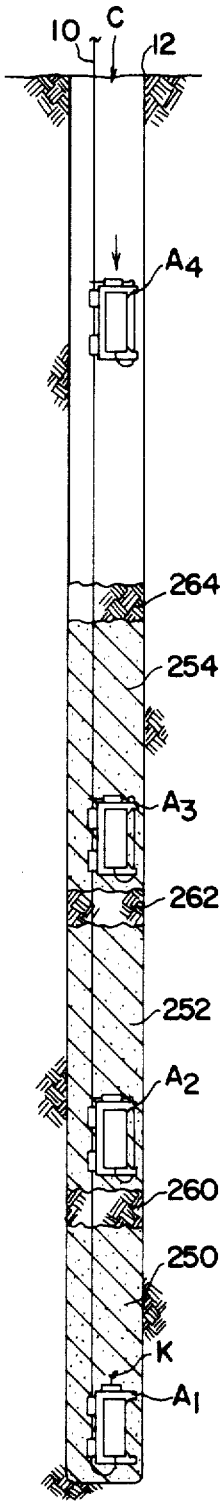
Figure 7I:
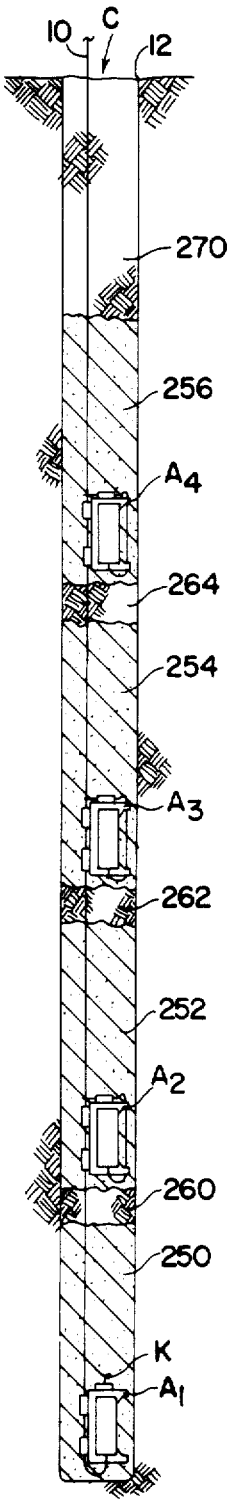

Referring now to FIGS. 6, 6A and 6B, a further modification of the present invention is illustrated. In this modicication, carrier X is used for supporting primer B in a manner similar to the support of the primer in carrier A. Carrier X is a unitary plastic structure including an upstanding rib 170 having outwardly extending arms 172, 174 and resilient flaps 176, only one of which is shown. This structure is substantially the same as previously described in connection with carrier A. Pairs 180, 182 and 184 of slit rings 190, 192 are provided adjacent the outside edge of rib 170 to slidably support carrier on down line detonating cord 10. Again, rib 170 provides spacing between detonating cord 10 and primer B so that detonating cord itself will not directly discharge primer B. Rib 170 also includes a plurality of laterally extending cylindrical openings 200, 202, 204. Each of these cylindrical openings receives a time delay cartridge 210 similar to the cartridge 132 and booster or cap 160, as previously described. In other words, a detonation wave at one end of cartridge 210 is delayed before appearing at the opposite end thereof or before causing detonation of the cartridge. The input ends 212 of cartridges 210 are held by lateral openings 200, 202 and 204 in detonation association with cord 10. In a like manner, the ouput ends 214 of the time delay cartridges are inserted into specially formed openings 216 within the side of primer B. Thus, the primer is provided with axially spaced openings corresponding to openings 200, 202, 204. Of course, it is possible to allow the cartridges 210 to rest against the outer peripheral wall of primer B and still cause detonation of the primer. In this particular embodiment, the time delay for all cartridges 210, three of which are shown for illustrative purposes, is the same. Consequently, upon detonation of cord 10, the selected time delay of cartridges 210 expires before detonation of primer B and therefore detonation of the charge associated with the primer and the borehole C. To use carrier X, carrier X is assembled onto cord 10. Thereafter, cartridges 210 are inserted into openings 200, 202 and 204 and primer B is snapped into the carrier. Then, carrier X can be dropped into the borehole C by sliding along detonating cord 10. This provides a sliding connection between carrier X and cord 10 without destroying the detonation continuity between the cord 10 and time delay cartridges 210. Thus, carrier X can be used in the method similar to that shown in FIG. 7 in the same manner as carrier A.

PREFERRED METHOD

Figure 7A:
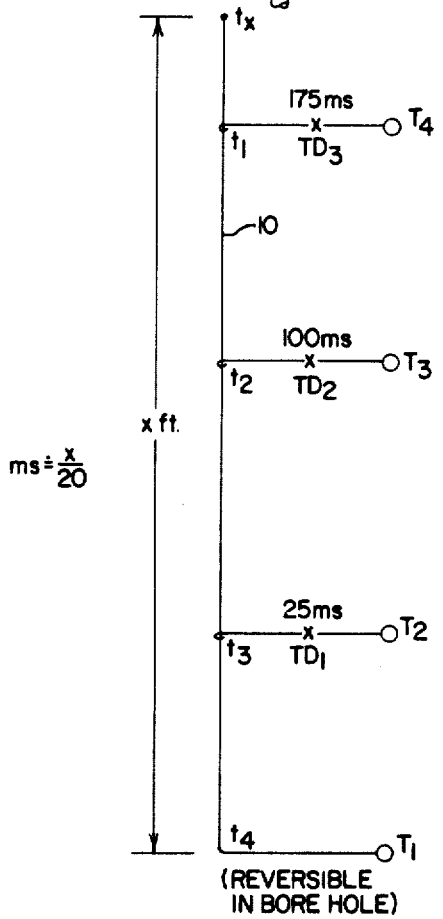

Referring now to FIGS. 7 and 7A, the preferred embodiment of the method practiced in accordance with the present invention is illustrated. In accordance with this method, explosive charges 250, 252, 254 and 256 are deposited into borehole C as shown in view IV of FIG. 7. This explosive material may be of any standard composition such as ANFO or ammonium nitrate slurry, to name only two. This material is generally immune from detonation by detonating cord of the type having a strength in the neighborhood of 30–60 grains per linear foot but is detonated by any of several standard primers. The primers can be detonated by the detonating cord 10. Each of the charges is in a separate axial location in borehole C. These charges are separated by layers 260, 262, and 264 formed from various materials such as soil. Although not necessary, a cap of earth or soil 270 may be applied above the uppermost charge 256. In accordance with the present method, a carrier, such as carrier A, constructed in accordance with the present invention may be connected to the end of down line 10 by bringing down line 10 through the split rings 54, 56 and then upwardly through the central bore in a primer B. Then, an appropriate knot K in cord 10 can be provided above primer B for holding the cord onto the lowermost carrier A. This carrier is then dropped into borehole C. Thereafter, the charge 250 is deposited in the borehole and covered by layer 260. Then, a second carrier $A_2$ is connected, as shown in FIGS. 1 or 4, and dropped down the detonating cord 10, as shown in FIG. 7. When carrier $A_2$ is in place, the explosive material of charge 252 is deposited into borehole C. Then layer 262 is positioned over charge 252. A third carrier $A_3$ is then assembled onto down line 10 and dropped into the borehole as best shown in view I of FIG. 7. This process is continued until the borehole is filled and charged as shown in view IV of FIG. 7. Referring now to FIG. 7A, a timing graph or time layout plan used in one embodiment of the present invention is illustrated. In this embodiment, the time delay provided on carrier $A_2$ is 25 ms. Carrier $A_3$ has an illustrated time delay of 100 ms and carrier $A_4$ has an illustrated time delay of 175 ms. Thus, with instantaneous detonation of down line 10, the primers are detonated in sequence. The first time spacing between carriers $A_1$ and $A_2$ is approximately 25 ms. The other time spacings are 75 ms. Thus, within 175 ms after detonation of cord 10 by trunk line T, all explosive charges within borehole B are detonated. There has been no instantaneous detonation of the total borehole, therefore, governmental regulations regarding the amount of material exploded within a given distance from an inhabited building or other structure is satisfied by selecting the amount of explosive material in the respective charges and by selecting the time delay between detonation of the axially spaced charges. In practice, the time delay between successive detonations is at least 8 ms and the time spacing is generally less than time spacing used in FIG. 7A, which is provided for illustrative purposes only. The illustrated embodiment is used as an example because standard somewhat inexpensive time delay devices are provided with the illustrated time delay values. As previously indicated, the time in milliseconds required to detonate along a standard detonating cord is less than a value obtained by dividing the length of the cord by 20. This value is set forth in FIG. 7A. Since this value is extremely small compared to the time delays used in the field and as illustrated in FIG. 7, the delay in cord 10 can be disregarded.

ANOTHER EMBODIMENT OF THE PRESENT INVENTION

Figure 8:
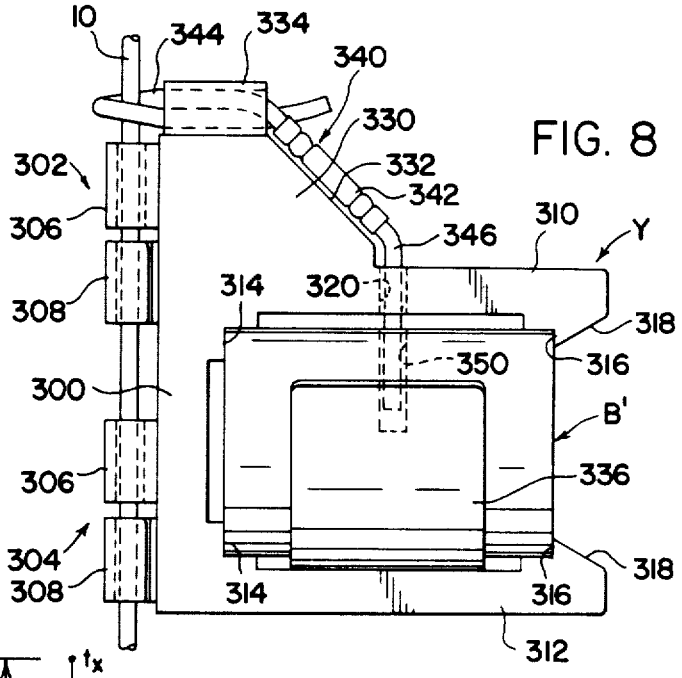
FIG. 8 is a side elevational view showing still a further modification of the present invention.

Referring now to FIG. 8, still a further embodiment of the present invention is illustrated. In this embodiment, carrier Y supports primer B′ in a generally horizontal direction for insertion into borehole C, and includes a generally vertical rib 300 for supporting axially spaced paris 302, 304 of slit rings 306, 308. Thus, carrier Y is assembled onto detonating cord 10 in accordance with the procedure used in previous embodiments of the invention. Rib 300 separates the detonating cord from primer B′ so that there is no direct primer detonation. Spaced, generally resilient arms 310, 312 are each provided with spaced abutments 314, 316 which are generally spaced from each other a distance corresponding to the axial length of primer B′. Inclined walls 318 allows easy insertion of primer B′ in an axial direction. An upper flange 330 defines an inclined support ledge 332 and carries an upper cord supporting tube 334, similar to tube 70 of carrier A. Resilient flaps 336, one of which is shown, are used to support primer B in carrier Y, as illustrated in FIG. 8. An elongated time delay element 340 is essentially the same as element 130, shown in FIG. 1. In accordance with this structure, a time delay cartridge 342 is connected between a first auxiliary detonation cord 344 and a second detonation cord 346. The first auxiliary cord is looped around detonation cord 10 after being passed through tube 334. The loose end is then directed back through tube 334 to provide a detonation connection with cord 10. A side bore 350 is provided in primer B′ and second auxiliary detonating cord 346 is directed from cartridge 342 through access hole 320 into this side bore 350. Thus, upon detection of cord 10, cartridge 342 causes a time delay prior to detonation of primer B′ at bore 350 by detonating cord 346. This modified carrier structure can be used in accordance with the method illustrated in FIG. 7.

Figure 9:
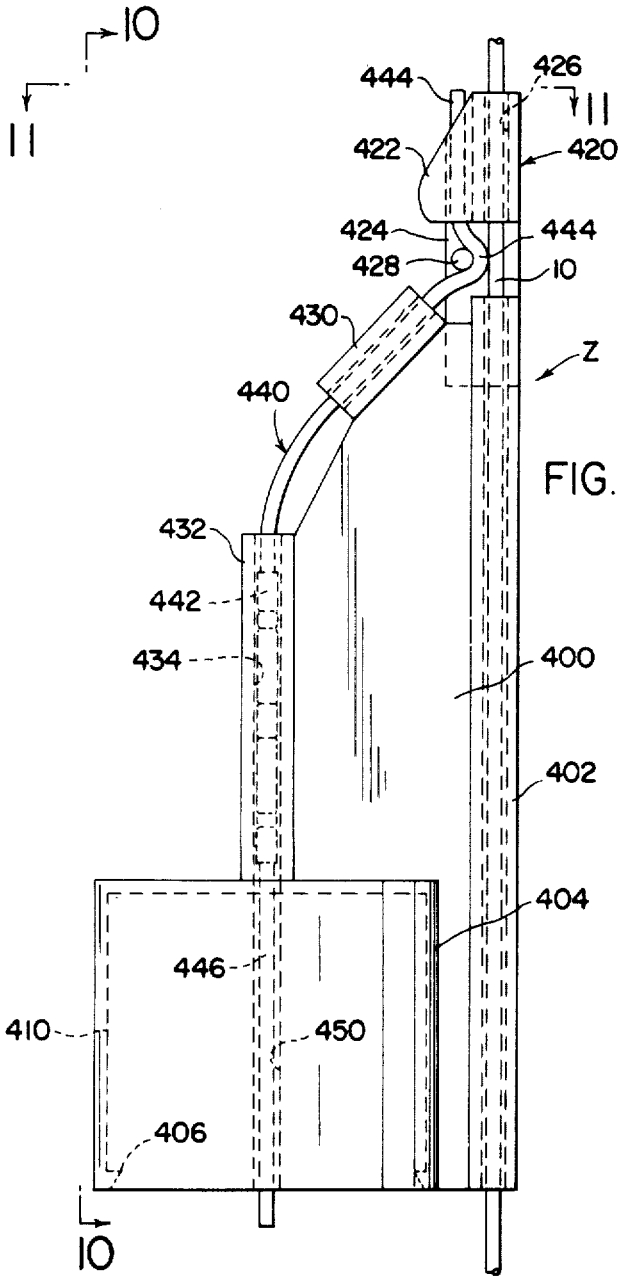
FIG. 9 is a side elevational view showing yet another modification of the present invention.
Figure 10:
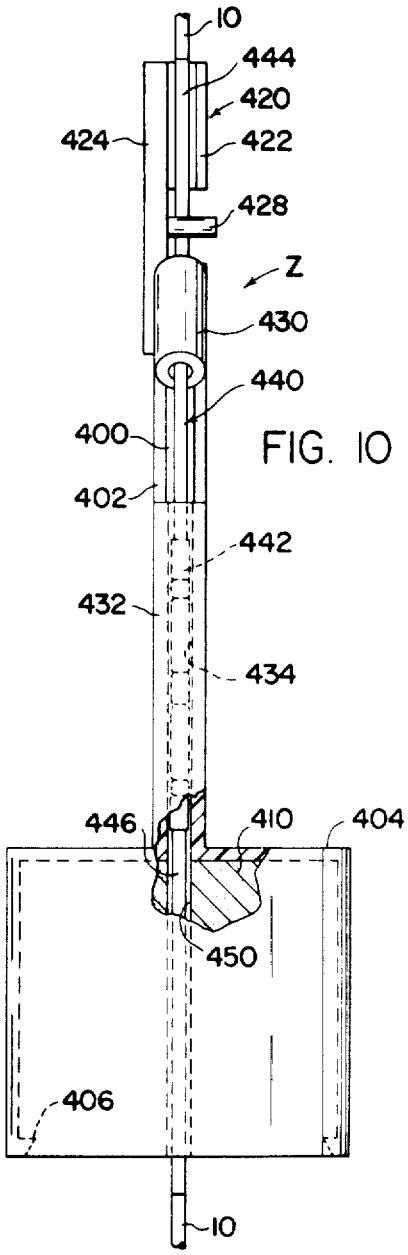
FIG. 10 is an end view taken generally along line 10—10 of FIG. 9.
Figure 11:
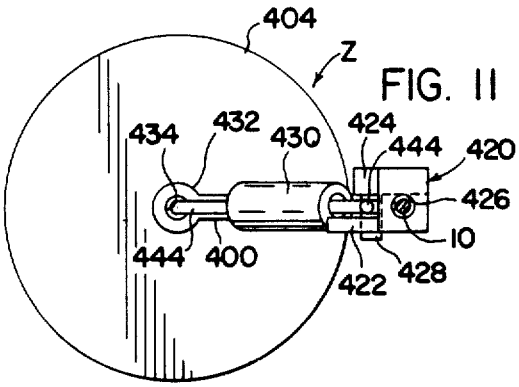
FIG. 11 is a top view taken generally along line 11—11 of FIG. 9.
Figure 12:
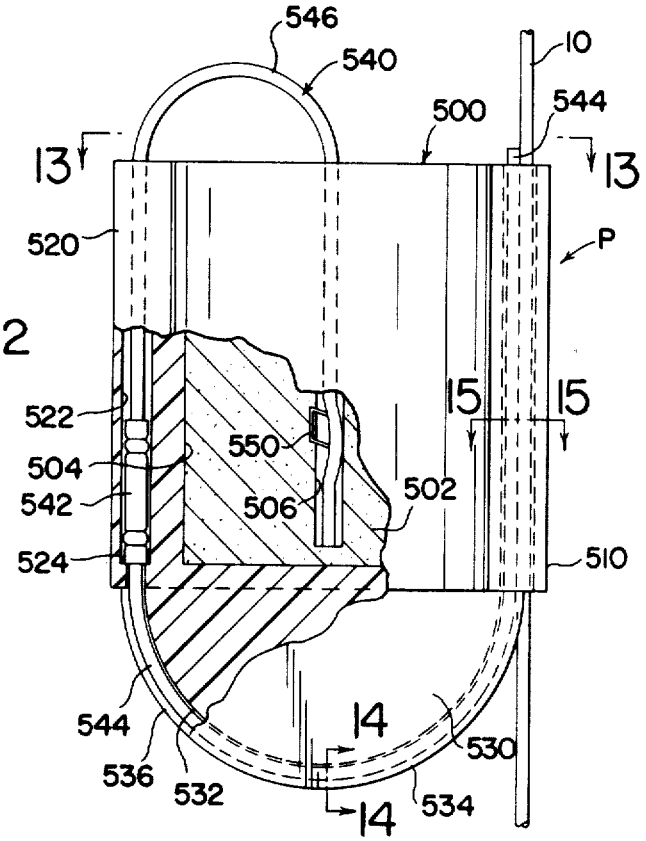
FIG. 12 is a partially cross-sectional view illustrating the preferred embodiment of the present invention.
Figure 13:
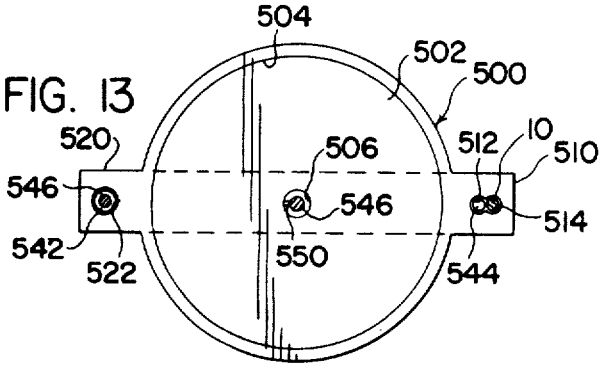
FIG. 13 is a top view taken generally along line 13—13 of FIG. 12.
Figure 14:
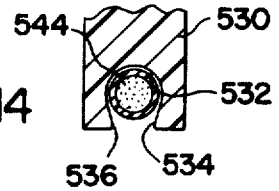
FIG. 14 is an enlarged cross-sectional view taken generally along line 14—14 of FIG. 12; and, FIG. 15 is an enlarged cross-sectional view taken generally along line 15—15 of FIG. 12.

Still a further embodiment of the present invention, i.e. a carrier Z, is illustrated in FIGS. 9–11. Carrier Z includes a vertically extending rib 400 supporting an enlogated tube 402 spaced from a downwardly opening cup 404 having a plurality of appropriate lugs or other structures 406 for holding cast primer material 410 within the cup. Thus, the primer material is not a separate primer but is cast into a receptacle formed integrally with rib 400. To guide the elongated time delay element on carrier Z, there is provided an upper bracket 420 having spaced guide plates 422, 424 and a bore 426. Detonating cord 10 extends through tube 402 and bore 426 to slidably mount carrier Z onto the cord. A pin 428 is spaced axially from the aligned axes of tube 402 and bore 426. A tube 430 positioned at an angle and a vertical tube 432 having a bore 434 are used to support an elongated time delay device 440 of the type having a time delay cartridge 442, a first detonating cord end 444 and a second detonating cord end 446. Detonating cord end 446 is inserted into a bore 450 cast through primer material 410, as best shown in FIG. 10. To assemble the elongated time delay device onto carrier Z and deposit the carrier into borehole C, the detonating cord is threaded through sleeve or tube 402, through bore 426. Then, second end 446 of detonating element 440 is placed into opening 450 in the cast primer. This locates the time delay cartridge 442 within bore 434 of tube 432. Thereafter, the second end 444 of the time delay element 440 is threaded through tube 430 around pin 428 and between spaced guide plates 422, 424. The spacing of pin 428 from the normal position of cord 10 holds the elongated time delay element adjacent to down cord 10. Thus, carrier Z can be dropped into the borehole in a manner previously described for performing the method as described in connection with FIG. 7. The friction contact, if any, between the time delay element and down cord 10 is relatively slight and is not sufficient to prevent or inhibit downward movement of carrier Z into the position necessary for a time delay discharge of primer material 410.

PREFERRED EMBODIMENT OF THE PRESENT INVENTION

Referring now to FIGS. 12–15, the preferred embodiment of the present invention is illustrated. In accordance with this embodiment, carrier P includes a molded plastic body 500 supporting a cast in place primer material 502 in a generally cylindrical, upwardly opening cavity 504. A center bore 506 is provided within cast primer material 502. In accordance with this embodiment of the invention, an outwardly extending, elongated wing 510 includes parallel bores 512, 514 intersecting at an elongated slot 516. A diametrically opposite wing 520 includes an elongated bore 522 with a shoulder 524. These two diametrically opposed, radially extending wings 510, 520 are joined by an arcuate, downwardly extending guide plate 530 having an arcuate slot 532 with an outer periphery defined by lips 534, 536. An elongated time delay element 540 is provided for directing detonation between cord 10 and primer material 502. As in other embodiments of the invention, this elongated time delay element may take the form of a time delay cartridge 542 having two auxiliary detonating cord sections 544, 546. The second of these sections is held within bore 506 by a detent, illustrated as a stable 550.

Figure 15:
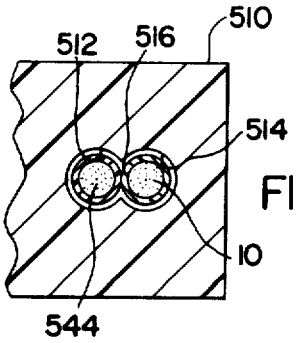

In this preferred embodiment of the invention, cartridge 542 is placed within bore 522 and rests upon shoulder 524. This prevents downward movement of cartridge 542 beyond the position shown in FIG. 12. Thereafter, the first auxiliary detonating cord section 544 is extended around guide plate 530 and in slot 532. In addition, this detonating cord section is threaded axially through parallel bore 512. The second auxiliary detonating cord section 546 is threaded into bore 506 and held therein by staple 550. Then carrier P is threaded onto down cord 10 and dropped into the borehole. Slot 516 allows sliding contact between cord 10 and cord section 544. The width of this slot is substantially less than the diameter of cords 10, 544 so that the cords remain in the respective 512, 514. As in all carriers constructed in accordance with the present invention, carrier P is deposited at a lower position in the borehole. Thus, as the borehole C is filled, the carrier goes to a different position longitudinally along down line detonating cord 10. In this embodiment of the invention, there is a side-by-side, generally elongated contact between the time delay element and down cord 10. This is accomplished by the parallel intersecting bores 512, 514 which are so dimensioned to maintain relatively close contact between the two adjacent detonating cord elements. Generally, the two cords are in sliding engagement, as shown in FIG. 15. By providing shoulder 524, the downward movement of carrier P which causes a certain upward pull on detonating cord section 544 will not dislodge the time delay device.

The various structural features in the several embodiments of the invention could be incorporated in other embodiments. For instance, a low energy detonating cord with a time delay booster or cap could be used as the time delay element in the embodiment shown in FIGS. 12–15. In that instance, the booster or cap would be held within primer material 502 by detent 550 and the low energy detonating cord would be wrapped into the circuitous path illustrated in FIG. 12. Other cross modifications of the various illustrated carriers could be provided without departing from the intended spirit and scope of the invention.

Having thus defined the invention, it is claimed:

1. A method of charging a borehole with at least first and second separated sections of explosive material, said method comprising the steps of:

(a) providing a detonating cord extending into said borehole;

(b) providing a first primer on a first carrier having an elongated first time delay element with an inlet cord and extending between said detonating cord and said first primer, said time delay element having a first selected time delay value;

(c) providing a second primer or a second carrier having an elongated second time delay element with an inlet cord and extending between said detonating cord and said first primer, said second time delay element having a second selected time delay value different from said first time delay value;

(d) maintaining said inlet cord of said first time delay element in slidable contact with said detonating cord;

(e) maintaining said inlet cord of said second time delay element in slidable contact with said detonating cord;

(f) loading said first section of explosive material into said borehole;

(g) sliding said first carrier and primer along said detonating cord and into a position in said borehole where said primer is in detonation relationship with said first section of explosive material;

(h) loading a separating non-explosive decking material over said first section of explosive material;

(i) loading said second section of explosive material into said borehole; and (j) sliding said second carrier and primer along said detonating cord and into a position in said borehole where said primer is in detonation relationship with said second section of explosive material.

*2. A method as defined in claim 1 wherein said maintaining steps each includes the step of holding said inlet cord of a given delay element and said common detonating cord in a common bore of the carrier carrying said given delay element.*

*3. A method as defined in claim 1 wherein said maintaining steps each includes the step of holding said inlet cord of a given delay element in sliding engagement with said detonating cord.*

*4. A method of charging a borehole with at least first and second separated sections of explosive material, said method comprising the steps of:*

*(a) providing a detonating cord extending into said borehole;*

*(b) providing a first primer on a first carrier having an elongated first time delay element with an input end and extending between said detonating cord and said first primer, said time delay element having a first selected time delay value;*

*(c) providing a second primer on a second carrier having an elongated second time delay element with an input end and extending between said detonating cord and said second primer, said second time delay element having a second selected time delay value different from said first time delay value;*

*(d) maintaining said input end of said first time delay element is slidable contact with said detonating cord;*

*(e) maintaining said input end of said second time delay element in slidable contact with said detonating cord;*

*(f) loading said first section of explosive material into said borehole;*

*(g) sliding said first carrier and primer along said detonating cord and into a position in said borehold where said first primer is in detonation relationship with said first section of explosive material;*

*(h) loading a separating non-explosive decking material over said first section explosive material;*

*(i) loading said second section of explosive material into said borehole; and*

*(j) sliding said second carrier and primer along said detonating cord and into a position in said borehole where said second primer is in detonation relationship with said second section of explosive material.*

*5. A method as defined in claim 4 wherein said maintaining steps each includes the step of holding said input end of a given delay element in sliding engagement with said detonating cord.*

* * * * *

UNITED STATES PATENT AND TRADEMARK OFFICE

CERTIFICATE OF CORRECTION

PATENT NO. : RE. 31,953

DATED : July 23, 1985

INVENTOR(S) : Brook J. Calder, Jr., David L. Childs, Robert N. Prescott, Donald W. Lyons It is certified that error appears in the above-identified patent and that said Letters Patent are hereby corrected as shown below:

Column 1, line 18, "the" (first occurence) should read --- then ---; line 47, "denonate" should read --- detonate ---. Column 2, line 41, "systems" should read --- system ---. Column 4, line 4, "FIG. 2" should begin a new paragraph. Column 5, line 7, "bore line" should read --- borehole ---; line 45, "44" should read --- 94 ---. Column 6, line 12, "76" should read --- 46 ---; line 22, "effecting" should read --- affecting ---;line 24, after "cord" (third occurrence) insert --- 10 ---. Column 7, line 35, after "element" insert --- 150 ---; line 37, after "have" (first ocarrence) insert --- a ---; line 43, after "156" insert --- coated ---; line 53, "or" should read --- and ---. Column 8, line 2, after "invention" delete the comma (,); line 13, after "carrier" insert --- X ---. Column 9, line 8, "A" should read --- $A_1$ ---; line 30, "B" should read --- C ---; line 60, "paris" should read --- pairs ---. Column 10, line 1, "allows" should read --- allow ---; line 18, "detection" should read --- detonation ---; line 26, "enlogated" should read --- elongated ---. Column 11, line 19, "stable" should read --- staple ---; line 35, after "respective" insert --- bores ---. Column 12, line 6, "or" should read --- on ---; line 9, "first" should read --- second ---; line 30, after "said" insert --- second ---; line 64, "borehold" should read --- borehole ---.

Signed and Sealed this

Seventh Day of October, 1986

[SEAL]

*Attest:*

DONALD J. QUIGG

*Attesting Officer*

*Commissioner of Patents and Trademarks*